United States Patent [19]
Kohyama et al.

[11] Patent Number: 4,726,999
[45] Date of Patent: Feb. 23, 1988

[54] LAMINATED STRUCTURE COMPRISING A SUBSTRATE LAYER COMPOSED OF A CRYSTALLINE PROPYLENE RESIN AND A HEAT-SEALABLE LAYER COMPOSED OF A CRYSTALLINE PROPYLENE RANDOM COPOLYMER COMPOSITION

[75] Inventors: Masaki Kohyama, Ichihara; Takeshi Muranaka, Iwakuni; Kunisuke Fukui, Hiroshima; Norio Kashiwa, Iwakuni, all of Japan

[73] Assignee: Shell Oil Company, Houston, Tex.

[21] Appl. No.: 792,659

[22] Filed: Oct. 29, 1985

[30] Foreign Application Priority Data

Oct. 31, 1984 [JP] Japan ............... 59-227988
Oct. 31, 1984 [JP] Japan ............... 59-227989

[51] Int. Cl.$^4$ ................................. C08J 5/18
[52] U.S. Cl. ......................... 428/516; 428/35; 428/349; 428/336; 525/240
[58] Field of Search ............ 428/516, 349, 35, 335, 428/336; 526/348.1

[56] References Cited

U.S. PATENT DOCUMENTS

| | | | |
|---|---|---|---|
| 3,296,232 | 1/1967 | Cleary | 260/88.2 |
| 3,316,226 | 4/1967 | Clark et al. | 260/88.2 |
| 3,489,732 | 1/1970 | Eichenbaum | 260/80.78 |
| 3,542,717 | 11/1970 | Lipman | 260/27 |
| 3,699,090 | 10/1972 | Nagel | 260/88.2 |
| 4,186,240 | 1/1980 | Matsuda et al. | 428/349 |
| 4,230,767 | 10/1980 | Isaka et al. | 428/349 |
| 4,384,089 | 5/1983 | Dehm | 526/159 |
| 4,527,581 | 7/1985 | Motier | 137/13 |
| 4,600,762 | 7/1986 | Fukui et al. | 526/348.6 |

FOREIGN PATENT DOCUMENTS 0135358 3/1985 European Pat. Off.
58032611 8/1981 Japan.
1582186 12/1980 United Kingdom.
2055688 3/1981 United Kingdom.

Primary Examiner—Edith Buffalow
Attorney, Agent, or Firm—Sherman and Shalloway

[57] ABSTRACT

A laminated structure comprising a substrate layer of a crystalline propylene resin and, positioned in direct contact with at least one surface of said substrate layer, a heat-sealable layer of a crystalline random propylene copolymer composition, wherein the crystalline random propylene copolymer composition is a mixture composed of (I) a crystalline random propylene copolymer of a major amount of propylene with a minor amount of another alpha-olefin, and
(II) a random copolymer consisting essentially of more than 60 to 99 mole % of 1-butene and less than 40 to 1 mole % of propylene, the weight ratio of (I)/(II) being from 5/95 to 90/10, and the radom copolymer (II) has (A) an intrinsic viscosity $[\eta]$, determined in decalin at 135° C., of 0.5 to 6 dl/g,
(B) a DSC melting point (Tm), measured by a differential scanning calorimeter, of 50 to 130° C., (C) a degree of crystallinity, measured by X-ray diffractometry, of 5 to 60%,
(D) a boiling methyl acetate-soluble content ($W_1$) of not more than 2% by weight based on the weight of the copolymer (II), and
(E) an n-decane/acetone (1:1 by volume) mixture-soluble content ($W_2$) of less than $4\times[\eta]^{-1.2}$ in % by weight based on the weight of the copolymer (II);

and a crystalline random propylene copolymer composition used for the said laminated structure.

14 Claims, No Drawings

LAMINATED STRUCTURE COMPRISING A SUBSTRATE LAYER COMPOSED OF A CRYSTALLINE PROPYLENE RESIN AND A HEAT-SEALABLE LAYER COMPOSED OF A CRYSTALLINE PROPYLENE RANDOM COPOLYMER COMPOSITION

This invention relates to a laminated structure having improved heat-seal properties and comprising a substrate layer of a crystalline propylene resin and a heat-sealable layer of a crystalline random propylene copolymer composition, the heat-sealable layer being positioned in direct contact with at least one surface of the substrate layer.

This invention also pertains to the above crystalline propylene random copolymer composition useful for the formation of the laminated structure.

The laminated structure of this invention has excellent heat sealability at low temperatures and heat seal strength, a broad range of heat sealable temperatures, and also superior scratch resistance and antiblocking property. The laminated structure, therefore, is very useful in the form of a laminate fiber or sheet, a laminated package or container, etc. in the field of packaging various products or articles including foodstuffs, apparels, daily goods and sundries.

More specifically, this invention relates to a laminated structure comprising a substrate layer of a crystalline propylene resin and, positioned in direct contact with at least one surface of said substrate layer, a heat-sealable layer of a crystalline random propylene copolymer composition, wherein the crystalline random propylene copolymer composition is a mixture composed of (I) a crystalline random propylene copolymer of a major amount of propylene with a minor amount of another alpha-olefin, and (II) a random copolymer consisting essentially of more than 60 to 99 mole % of 1-butene and less than 40 to 1 mole % of propylene, the weight ratio of (I)/(II) being from 5/95 to 90/10, and the random copolymer (II) has (A) an intrinsic viscosity $[\eta]$, determined in decalin at 135° C., of 0.5 to 6 dl/g, (B) a DSC melting point (Tm), measured by a differential scanning calorimeter, of 50° to 130° C., (C) a degree of crystallinity, measured by X-ray diffractometry, of 5 to 60%, (D) a boiling methyl acetate-soluble content ($W_1$) of not more than 2% by weight based on the weight of the copolymer (II), and (E) an n-decane/acetone (1:1 by volume) mixture-soluble content ($W_2$) of less than $4 \times [\eta]^{-1.2}$ in % by weight based on the weight of the copolymer (II).

Crystalline propylene resin films or sheets have found extensive use in the field of packaging, particularly packaging of foodstuffs, because of their superiority in mechanical properties such as tensile strength, rigidity, surface hardness and impact strength, optical properties such as gloss and transparency, and food hygiene such as the freedom from toxicity and odor. They, however, have the defect that temperatures at which a single layer of such a crystalline propylene resin film can be heat-sealed are high and a proper range of these heat-sealing temperatures is narrow.

Attempts have been made to eliminate such defect by providing laminated structures comprising a substrate layer of a crystalline propylene resin and positioned in direct contact with at least one surface of the substrate layer, a heat-sealable layer of a crystalline propylene random copolymer composition.

For example, Japanese Laid-Open patent publication No. 65552/1980 (laid-open on May 17, 1980) discloses a laminated structure comprising a substrate layer of a crystalline propylene resin, and in direct contact with at least one surface thereof, a heat-sealable layer of a crystalline random propylene copolymer composition composed of 20 to 84% by weight of a propylene/ethylene copolymer having an ethylene content of 0.5 to 10% by weight and containing propylene as a main component and 80 to 6% by weight of a propylene/$C_4$–$C_{10}$ alpha-olefin copolymer containing propylene as a main component and having a $C_4$–$C_{10}$ alpha-olefin content of 5 to 30% by weight. This patent document fails to disclose or suggest a heat-sealable layer having the combination of parameters (I) and (II) used in the laminated structure of the present invention. The use of the propylene/$C_4$–$C_{10}$ alpha-olefin copolymer containing propylene as a main component, which is evidently remote, and different, from the component (II) in the present invention, is essential in the above patent document.

Japanese Laid-Open patent publication No. 91665/1980 (laid-open on July 11, 1980) proposes a laminated structure comprising a substrate layer of a crystalline propylene resin, and in direct contact with at least one surface thereof, a heat-sealable layer of a crystalline propylene random copolymer composition composed of 86 to 95% by weight of a propylene/ethylene copolymer containing propylene as a main component and having an ethylene content of 0.5 to 10% by weight and 14 to 5% by weight of a butene/ethylene copolymer containing butene as a main component and having a butene content of 70 to 99% by weight. This patent document neither discloses nor suggests a heat-sealable layer satisfying the combination of parameters (I) and (II) in the laminated structure of the present invention. The use of the butene/ethylene copolymer which evidently is of a different type is essential.

Japanese Laid-Open patent publication No. 106585/1979 (laid open on Aug. 21, 1979) discloses a laminated structure comprising a substrate layer composed of a crystalline propylene resin, and in direct contact with at least one surface thereof, a heat-sealable layer of a composition composed of 75 to 97% by weight of a polymer mixture composed of 5 to 85% by weight of a propylene/ethylene copolymer containing propylene as a main component and having an ethylene content of 0.5 to 10% by weight and 95 to 15% by weight of a butene/ethylenically unsaturated monomer (excluding butene) copolymer containing butene as a main component and having a butene content of 70 to 99% by weight, 3 to 25% by weight of a low-molecular-weight thermoplastic resin such as natural and synthetic waxes, hydrocarbon resins (such as petroleum resins), rosin, dammar resins, phenolic resins and chlorinated aliphatic hydrocarbon waxes. This patent document neither describes nor suggests a heat-sealable layer satisfying the combination of the parameters (I) and (II) in the laminated structure of the present invention, and the use of the low-molecular-weight thermoplastic resin which is evidently of a different type, is essential.

U.S. Pat. No. 4,230,767 originally filed with a Convention priority claim from Japanese patent application Nos. 13932/1978 (equivalent to Japanese Laid-Open patent publication No. 106585/1979 cited above) and 165137/1978 (equivalent to Japanese Laid-Open patent publication No. 91665/1980 cited above) quite fails to disclose a heat-sealable layer satisfying the combination of the parameters (I) and (II) in the laminated structure of the present invention, and neither describes nor suggests the random copolymer having the characteristics (A) to (E).

The laminated structures obtained in the prior art discussed above have improved heat-sealability but temperatures at which the heat-sealable layers of these laminated structures can be heat-sealed are still within a narrow range and are not sufficient. Furthermore, their heat seal strengths are by no means sufficient.

To impart antistatic properties to these laminated structures, it is the usual practice to subject them to low-temperature heat-treatment for several days. The conventional laminated structures have the defect that when this antistatic treatment is carried out, the temperatures applicable to heat-sealing considerably increase.

It has therefore been strongly desired to provide a laminated structure comprising a substrate layer of a crystalline propylene resin and a heat-sealable layer of a crystalline random propylene copolymer in which temperatures applicable to heat sealing are lowered, the range of such applicable temperatures is broadened, the heat seal strength is high, and the increasing of the heat sealable temperatures owing to the above heat-treatment at low temperatures is small.

The present inventors have made investigations in order to develop a laminated structure which meets these requirements. These investigations have led to the discovery that a laminated structure comprising a substrate layer of a crystalline propylene resin and, positioned in direct contact with at least one surface of said substrate layer, a heat-sealable layer of a crystalline random propylene copolymer composition composed of a mixture of (I) a crystalline random propylene copolymer of a major amount of propylene with a minor amount of another alpha-olefin and (II) a random copolymer of a major amount of 1-butene and a minor amount of propylene and having the characteristics (A) to (E) above can be heat-sealed at relatively low temperatures with a broad range of temperatures applicable to heat sealing and has a high heat seal strength, and the increasing of the heat-sealable temperatures owing to low-temperature heat-treatment is small.

It is an object of this invention to provide a laminated structure having improved properties and comprising a substrate layer of a crystalline propylene resin and positioned in direct contact with at least one surface thereof, a heat-sealable layer of a specific crystalline random propylene copolymer.

Another object of this invention is to provide a specified crystalline propylene random copolymer composition useful for providing the aforesaid laminated structure.

The above and other objects and advantages of this invention will become more apparent from the following description.

The laminated structure of this invention comprises a substrate layer of a crystalline propylene resin and, positioned in direct contact with at least one surface thereof, a heat-sealable layer of a crystalline random propylene copolymer composition.

The laminated structure of this invention is characterized in that the crystalline random propylene copolymer composition is a mixture of (I) and (II) indicated below in a (I)/(II) weight ratio of from 5/95 to 90/10.

(I) A crystalline random propylene copolymer of a major amount of propylene with a minor amount of another alpha-olefin, and (II) a random copolymer consisting essentially of more than 60 to 99 mole % of 1-butene and less than 40 to 1 mole % of propylene.

The random copolymer (II) has the following characteristics (A) to (E).

(A) an intrinsic viscosity $[\eta]$, determined in decalin at 135° C., of 0.5 to 6 dl/g, (B) a DSC melting point (Tm), measured by a differential scanning calorimeter, of 50° to 130° C., (C) a degree of crystallinity, measured by X-ray diffractometry, of 5 to 60%, (D) a boiling methyl acetate-soluble content ($W_1$) of not more than 2% by weight based on the weight of the copolymer (II), and (E) an n-decane/acetone (1:1 by volume) mixture-soluble content ($W_2$) of less than $4 \times [\eta]^{-1.2}$ in % by weight based on the weight of the copolymer (II).

The random copolymer (II) having the characteristics (A) to (E) is not described in the known literature. Novel copolymers overlapping this random copolymer are described in U.S. patent application Ser. No. 639,069 and the corresponding European Laid-Open patent publication No. 135358.

The laminated structure of this invention may be in such a form as a laminated film, a laminated sheet, a laminated bag, or a laminated container, or in any other various forms.

The substrate layer of the crystalline propylene resin constituting the laminated structure of this invention may be non-stretched or in a monoaxially or biaxially stretched state. The heat-sealable layer of the crystalline random propylene copolymer composition may likewise be non-stretched or in a monoaxially or biaxially stretched state. Hence, the substrate layers in the above states and the heat-sealable layers in the above states may be used in any desired combinations.

In the laminated structure of this invention, the thicknesss of the substrate layer can be properly selected and is, for example, from 5 to 200 microns. The thickness of the heat-sealable layer can also be properly selected, and is, for example, about 0.1 to about 50 microns, preferably about 0.5 to about 30 microns. These thicknesses may be varied properly depending upon the shape, type, etc. of the laminated structure. For example, in the case of a laminated film or sheet, the substrate layer may have a thickness of about 5 to about 200 microns, preferably about 10 to about 70 microns, and the heat-sealable layer may have a thickness of about 0.1 to about 50 microns, preferably about 0.5 to about 30 microns.

The laminated structure can be produced by using laminating means known per se. The following methods may be cited as examples.

(1) A method which comprises co-extruding crystalline polypropylene which is to form the substrate layer and the crystalline random propylene copolymer composition composed of a mixture of (I) and (II) in the molten state, and as required, stretching the resulting laminate separately or simultaneously in the machine direction and/or the transverse direction.

(2) A method which comprises extruding the crystalline random propylene copolymer composition in the molten state onto the surface of a non-stretched, monoaxially stretched or biaxially stretched propylene resin substrate, and when the substrate is non-stretched, optionally stretching the resulting laminate monoaxially or biaxially. When the substrate is monoaxially stretched, the resulting laminate may, if required, be further stretched in the same direction as the stretching of the substrate or in a direction crossing that direction.

(3) A method which comprises laminating a film of the crystalline random propylene copolymer composition composed of a mixture of (I) and (II) to the surface of a substrate of crystalline propylene resin by using an adhesive. Examples of the adhesive used are emulsions of polyvinylidene chloride, polyacrylic acid esters and chlorinated polypropylene. After the adhesive is applied to the substrate, the film of the composition is laminated.

In method (3), the pre-formed substrate layer and heat-sealable layer may, as desired, be monoaxially or biaxially stretched. In methods (1), (2) and (3), the stretching temperature and the stretch ratio may be properly selected. For example, the substrate layer may be stretched in the machine direction at about 45° to 60° C. and in the transverse direction at about 160° to 170° C. The stretch ratio may, for example, be from 4 to 6.

The crystalline propylene resin constituting the substrate layer of the laminated structure of this invention includes, for example, a crystalline propylene homopolymer, and crystalline random copolymers of a major proportion of propylene with up to about 10 mole %, preferably up to about 5 mole % of alpha-olefins other than propylene, for example $C_2$-$C_{10}$ alpha-olefins such as ethylene, 1-butene, 4-methyl-1pentene, 1-hexene, 1-octene and 1-decene. Examples of such copolymers are a random propylene/ethylene copolymer having an ethylene content of 0.1 to 5 mole %, a random propylene/ethylene/1-butene copolymer having an ethylene content of 0.1 to 4 mole % and a 1-butene content of 0.1 to 5 mole %, and a random propylene/1-butene random copolymer having a 1-butene content of 0.1 to 5 mole %.

The crystalline propylene resin constituting the substrate layer of the laminated structure of the invention advantageously has an intrinsic viscosity [η], determined in decalin at 135° C., of 1.5 to 4 dl/g, preferably 1.7 to 3.5 dl/g, and a crystallinity, measured by X-ray diffractometry, of 50 to 70%, preferably 55 to 70%.

The components (I) and (II) of the crystalline random propylene copolymer composition constituting the heat-sealable layer in the laminated structure of this invention will be described below.

The component (I) is a crystalline random propylene copolymer of a major amount of propylene with a minor amount of another alpha-olefin.

The content of propylene in the crystalline random propylene copolymer (I) can be properly selected. Preferably, it is 99 to 85 mole %, preferably 98 to 90 mole %. The content of the other alpha-olefin is preferably 1 to 15 mole %, preferably 2 to 10 mole %. The other alpha-olefin constituting the copolymer (I) is a $C_2$-$C_{10}$ alpha-olefin (excluding propylene) such as ethylene, 1-butene, 1-pentene, 1-hexene, 4-methyl-1-pentene, or mixtures thereof. Advantageously, the crystalline random propylene copolymer (I) has an intrinsic viscosity [η], measured in decalin at 135° C., of 1.5 to 4, preferably 1.7 to 3.4, dl/g, a melting point [Tm], measured by a differential scanning calorimeter, of 120° to 155° C., preferably 120° to 145° C., and a crystallinity, measured by X-ray diffractometry, of 35 to 60%, preferably 35 to 50%.

The component (II) is a random copolymer consisting essentially of more than 60 to 99 mole %, preferably 65 to 96%, of 1-butene and less than 40 to 1 mole %, preferably 4 to 35 mole %, of propylene and having the characteristics (A) to (E) described hereinabove. If desired, the random copolymer (II) may further contain a small amount, particularly up to 5 mole %, of another alpha-olefin, for example a $C_2$-$C_{10}$ alpha-olefin excepting 1-butene and propylene. The olefin content of the copolymer (I) and copolymer (II) can be measured by $C^{13}$-NMR.

If the 1-butene content is not more than 60 mole % in the copolymer (II), the laminated structure obtained by laminating the crystalline random propylene copolymer composition has a blocking tendency and reduced scratch resistance. Furthermore, temperatures at which the laminated structure can be heat-sealed increase. On the other hand, if the 1-butene content is larger than 99 mole % in the copolymer (II), the heat-sealing temperature for the laminated structure of the invention increases and its heat sealing temperature is reduced.

The copolymer (II) should satisfy the characteristics (A) to (E) in addition to the specified quantitative ranges of 1-butene and propylene described above.

The copolymer (II) has an intrinsic viscosity [η], determined in decalin at 135° C., of 0.5 to 6 dl/g, preferably 1 to 5 dl/g, (A). If the intrinsic viscosity of the copolymer (II) is higher than 6 dl/g, the thickness of the heat-sealable layer of the resulting laminated structure of the invention is difficult to decrease. If it is less than 0.5 dl/g, the heat seal strength of the laminated structure decreases and the temperatures at which the laminated structure can be heat sealed rise greatly.

The copolymer has a DSC melting point (Tm), measured by a differential scanning calorimeter, of 50° to 130° C., preferably 60° to 125° C., (B). If the DSC melting point of the copolymer (II) becomes higher than 130° C., the temperatures at which the laminated structure of the invention obtained by laminating the crystalline random propylene copolymer composition can be heat-sealed become high, and the heat seal strength of the laminated structure decreases. If, on the other hand, it is lower than 50° C., the laminated structure has a blocking tendency and reduced scratch resistance. Furthermore, temperatures at which the laminated structure can be heat sealed rise greatly. The DSC melting point is measured as follows: A 0.1 mm-thick press sheet taken 20 hours after its molding is subjected to differential scanning calorimetry at a temperature raising rate of 10° over a range of 0° to 200° C., and the maximum endothermic peak is determined and defined as Tm.

The copolymer (II) has a crystallinity, measured by X-ray diffractometry, of 5 to 60%, preferably 10 to 58%, (C). If the crystallinity of the copolymer (II) exceeds 60%, the heat sealing temperature for a laminated structure obtained by laminating the crystalline propylene random copolymer composition becomes high, and its heat seal strength is reduced. If it is less than 5%, the resulting laminated structure has a blocking tendency and reduced scratch resistance. Furthermore, temperatures at which the laminated structure can be heat-sealed rise greatly. The crystallinity is determined by X-ray diffractometry using a 1.5 mm-thick press sheet taken 20 hours after its molding.

The random copolymer (II) also has a boiling methyl acetate-soluble content [$W_1$] of not more than 2% by weight, for example, 0.01 to 2% by weight, preferably 0.02 to 1% by weight, more preferably 0.03 to 0.5% by weight, based on the weight of the copolymer (II). The boiling methyl acetate-soluble content [$W_1$] is preferably within the range represented by the following formulae.

$$0.01 \leq W_1 \leq 0.03a + 0.5$$

more preferably $$0.02 \leq W_1 \leq 0.02a + 0.4$$

especially preferably $$0.03 \leq W_1 \leq 0.01a + 0.3$$

In the above formulae a represents the content in mole % of the propylene component in the 1-butene copolymer.

If the [$W_1$] is larger than 2% by weight, a laminated structure obtained by laminating the crystalline random propylene copolymer composition has a blocking tendency and reduced scratch resistance. Furthermore, temperatures at which it can be heat-sealed by heat-treatment rise greatly. The [$W_1$] is measured by the following method.

A polymer sample, having a size of about 1 mm×1 mm×1 mm is put in a cylindrical glass filter, and extracted for 7 hours by a Soxhlet extractor at a reflux frequency of about 1 per 5 minutes. The extraction residue is dried in a vacuum dryer (degree of vacuum less than 10 mmHg) and its weight is measured. The weight of that portion which dissolves in boiling methyl acetate is determined from a weight difference from the original sample. [$W_1$] is the percentage of the weight of the boiling methyl acetate-soluble portion based on the weight of the original sample.

The copolymer (E) further has an n-decane/acetone (1:1 by volume) mixture-soluble content ($W_2$) of less than $4 \times [\eta]^{-1.2}$ in % by weight based on the weight of the copolymer (II) (E). For example, $W_2$ is $0.1 \times [\eta]^{-1.2}$ to $4 \times [\eta]^{-1.2}$% by weight; preferably $0.2 \times [\eta]^{-1.2}$ to $3.5 \times [\eta]^{-1.2}$% by weight, especially preferably $0.3 \times [\eta]^{-1.2}$ to $3 \times [\eta]^{-1.2}$% by weight, based on the weight of the copolymer. [$\eta$] used herein means the intrinsic viscosity value of the copolymer (in the requirement (a) above). The soluble content ($W_2$) means that at 10° C. If the soluble content ($W_2$) of the copolymer (II) at 10° C. becomes not less than $4 \times [\eta]^{-1.2}$, a laminated structure obtained by laminating the crystalline random propylene copolymer composition has a blocking tendency and reduced scratch resistance. Furthermore, temperatures at which it can be heat-sealed by heat-treatment increase. The [$W_2$] value is determined as follows:

One gram of a copolymer sample, 0.05 g of 2,6-di-tert-butyl-4-methylphenol and 50 ml of n-decane are put in a 150 ml flask equipped with stirring vanes and dissolved on an oil bath at 120° C. After the dissolving, the solution is allowed to cool spontaneously at room temperature for 30 minutes. Then, 50 ml of acetone is added over 30 seconds, and the solution is cooled on a water bath at 10° C. for 60 minutes. The precipitated copolymer was separated from the solution containing a low-molecular-weight polymer component by filtration on a glass filter. The solution is dried at 150° C. and 10 mmHg until its weight becomes constant. The weight of the dried product is measured. The amount of the copolymer which dissolved in the mixed solvent is calculated as the percentage of the weight of the original sample copolymer. In the above method, the stirring is continuously effected from the time of dissolution until immediately before the filtration.

The copolymer (II) satisfies a combination of parameters represented by the characteristic values (A) to (E), and preferably also satisfies the following parameters (F) to (K).

Advantageously, the copolymer (II) has a yield strength (F), measured by the method of JIS K-7113, of 50 to 300 kg/cm$^2$, preferably 70 to 250 kg/cm$^2$, a tensile strength at break (G), measured by the method of JIS K-7113, of 150 to 800 kg/cm$^2$, preferably 200 to 600 kg/cm$^2$, and an elongation at break, measured by the method of JIS K-7113, of at least 300%, preferably 350 to 1000%.

In measuring the yield strength (F), the elongation at break (H), and the tensile strength at break (G), tensile tests are carried out in accordance with the method of JIS K-7113. Specifically, a No. 2 sample in accordance with JIS K-7113 punched out 19 hours after molding from a 1 mm-thick press sheet molded as indicated in JIS K6758 is used and the tests are performed in an atmosphere kept at 25° C. at a tensile speed of 50 mm/min. twenty hours after the formation of the press sheet.

When no clear yield point appears, the 20% elongation stress is made the yield point stress, and the yield strength (F) is determined on this asis.

The copolymer (II) preferably further has a torsional rigidity, measured by the method of JIS K-6745, of usually 500 to 3000 kg/cm$^3$, preferably 600 to 2500 kg/cm$^2$. The torsional rigidity (I) is measured by a method substantially in accordance with JIS K-6745. Specifically, a rectangular sample, 64 mm long and 6.35 mm wide, is punched out 9 days after molding from a 1 mm-thick press sheet molded in accordance with JIS K6758. Ten days after the molding of the press sheet, the rigidity of the sample is measured in an atmosphere at 25° C. at a torsional angle of 50° to 60° after the lapse of 5 seconds from the application of a load.

Advantageously, the copolymer (II has a Young's modulus (J), measured by the method of JIS K-7113, of 1000 to 6000 kg/cm$^2$, preferably 1100 to 5000 kg/cm$^2$. The Young's modulus (J) of the copolymer (II) is preferably expressed as follows with relation to the content (b mole %) of the propylene component.

$$5000 - 60b \geq J \geq 2000 - 30b$$

The Young's modulus is measured by the same tensile test as in the measurement of (F), (G) and (H).

The standard deviation $\sigma$ (K) of the 1-butene content of the copolymer (II) is usually not more than 0.4a mole %, preferably not more than 0.3 a mole % (a represents the propylene content in mole % of the copolymer (II)). The standard deviation $\sigma$ is a measure of the randomness of the copolymer (II). A copolymer in accordance with this invention which satisfies the characteristic value (K) as well as the characteristic values (A) to (J) shows better properties.

The standard deviation value $\sigma$ of the 1-butene random copolymer of this invention is determined by the following equation based on the composition distribution of the copolymer. The composition distribution of the copolymer is measured by an elution fractionation method using a column by changing the eluting temperature stepwise (at intervals of 5° C.) from 10° C. to 130° C. using p-xylene as a solvent. At this time, a fraction at each temperature is eluted for 4 hours using 2 liters of p-xylene for 10 g of more than ten fractions. The standard deviation σ is defined by the following equation.

$$\sigma = \left[ \int_0^{100} (\bar{x} - x)^2 f(x) dx \right]^{\frac{1}{2}}$$

wherein $\bar{x}$ is the average content (mole %) of 1-butene in the copolymer, x is the content mole %) of 1-butene, and f(x) is the differential distribution fraction of weight for a component with a content of x (mole %).

The random copolymer (II) used in this invention can be obtained by copolymerizing 1-butene and propylene at a temperature of about 20° to about 200° C. in the presence of a catalyst prepared from (i) a highly active titanium catalyst component containing magnesium, titanium, halogen and a diester as essential ingredients, (ii) an organoaluminum compound, and (iii) an organic silicon compound having an Si—O—C bond.

The highly active titanium catalyst component (i), the organoaluminum compound (ii), the organic silicon compound (iii), the polymerization conditions and the production of the random copolymer are described in the above-cited copending U.S. application Ser. No. 639,069 (corresponding to European Laid-Open patent publication No. 135358 published on Mar. 27, 1985) now U.S. Pat. No. 4,600,762. The random copolymer (II) used in this invention can be produced by selecting and presetting the catalyst, the polymerization conditions, etc. by preliminary experiments so that the final copolymer will satisfy the aforesaid characteristics (A) to (E) and preferably further (F) to (K). A detailed description of the production of the copolymer (II) is omitted, and it is only briefly stated below.

The highly active titanium catalyst component (i) contains magnesium, titanium, halogen and a diester as essential ingredients. In this titanium catalyst component (i), the magnesium/titanium atomic ratio is preferably from about 2 to about 100, more preferably from about 4 to about 70; the halogen/titanium atomic ratio is preferably from about 4 to about 100, more preferably from about 6 to about 40; and the diester/titanium mole ratio of preferably from about 0.2 to about 10, more preferably from about 0.4 to about 6. The titanium catalyst component has a specific surface area of preferably at least about 3 m²/g, more preferably at least about 40 m²/g, especially preferably from about 100 to about 800 m²/g.

The titanium catalyst component (i) is prepared preferably by contacting a magnesium compound (or magnesium metal), a titanium compound and a diester or a diester-forming compound with or without other reagents. The preparation can be effected in the same way as in the preparation of known highly active titanium catalyst components containing magnesium, titanium, halogen and an electron donor as essential ingredients. For example, it can be produced in accordance with the methods disclosed in British patent specifications Nos. 1492618, 1554340 and 1554248, U.S. Pat. Nos. 4,157,435, 4,076,924, 4,085,276, 4,250,285, 4,232,139, 4,143,223, 4,315,874, 4,330,649, 4,401,589 and 4,335,015, and European patent specification No. 22675.

Several embodiments of producing the titanium catalyst component (i) will be illustrated below.

(1) A magnesium compound or a complex of a magnesium compound and an electron donor is pre-treated or not-pretreated with an electron donor and/or a reaction aid such as an organoaluminum compound or a halogen-containing silicon compound in the presence or absence of an electron donor or a pulverization aid with or without pulverization. The resulting solid is reacted with a titanium compound which is in the liquid state under the reaction conditions. In the above procedure, the electron donor is used at least once as the electron donor.

(2) A magnesium compound in the liquid state having no reducing ability is reacted with a titanium compound in the liquid state in the presence of an electron donor to precipitate a solid titanium complex.

(3) The product obtained in (2) above is further reacted with a titanium compound.

(4) The product obtained in (1) or (1) is further reacted with a titanium compound and an electron donor.

(5) A magnesium compound or a complex of a magnesium compound and an electron donor is pulverized in the presence of a titanium compound and in the presence or absence of an electron donor and a pulverization aid, and with or without pre-treatment with an electron donor and/or a reaction aid such as an organoaluminum compound or a halogen-containing silicon compound, treated with a halogen, a halogen compound or an aromatic hydrocarbon. In the above procedure, the electron donor is used at least once.

Preferred among these methods are those in which a liquid titanium halide is used, or a halogenated hydrocarbon is used after or during the use of the titanium compound.

The electron donor used in the above methods of preparation is not necessarily limited to the diester or diester-forming compound. There may be used other electron donors such as alcohols, phenols, aldehydes, ketones, ethers, carboxylic acids, carboxylic acid anhydrides, carbonic acid esters, monoesters and amines.

Preferred examples of the diester as an essential component of the highly active solid titanium catalyst component (i) used in the invention include diesters of dicarboxylic acids in which two carboxyl groups are attached to one carbon atom and dicarboxylic acids in which one carboxyl group is attached to each of the two adjoining carbon atoms. Examples of the dicarboxylic acids in such dicarboxylic acid esters are dicarboxylic acid esters are extensively illustrated in the above-cited European Laid-Open patent publication, and can be utilized in the formation of the catalyst component (i) to be used in the production of the random copolymer (II). The alcohol component in the dicarboxylic acid diesters is also extensively described in the above European laid-open patent publication and can be utilized in the formation of the catalyst component (i).

Both a magnesium compound having reducing ability and a magnesium compound having no reducing ability can be used in the preparation of the solid highly active titanium catalyst component (i). These magnesium compounds are also extensively illustrated in the above European patent document. Preferred are the magnesium compounds having no reducing ability, and halogen-containing magnesium compounds, particularly, magnesium chloride, alkoxy magnesium chlorides and aryloxymagnesium chlorides are preferred.

Suitable titanium compounds used to prepare the titanium catalyst component (i) are tetravalent titanium compounds represented by $Ti(OR)_g X_{4-g}$ in which R is a hydrocarbon group, X is halogen and g is 0 to 4.

Specific examples of such titanium compounds include titanium tetrahalides such as $TiCl_4$, $TiBr_4$ and TiI$_4$; alkoxytitanium trihalides such as Ti(OCH$_3$)Cl$_3$, Ti(OC$_2$H$_5$)Cl$_3$, Ti(O n-C$_4$H$_9$)Cl$_3$, Ti(OC$_2$H$_5$)Br$_3$ and Ti(O iso-C$_4$H$_9$)Br$_3$; alkoxytitanium dihalides such as Ti(OCH$_3$)$_2$Cl$_2$, Ti(OC$_2$H$_5$)$_2$Cl$_2$, Ti(O n-C$_4$H$_9$)$_2$Cl$_2$ and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(O n-C$_4$H$_9$)$_3$Cl and Ti(OC$_2$H$_5$)$_3$Br; and tetraalkoxytitaniums such as Ti(OCH$_3$)$_4$, Ti(OC$_2$H$_5$)$_3$ and Ti(O n-C$_4$H$_9$)$_4$. Among them, the halogen-containing titanium compounds, particularly titanium tetrahalides, especially preferably titanium tetrachloride, are preferred. These titanium compounds may be used singly or as a mixture. Or they may be used as diluted in hydrocarbons or halogenated hydrocarbons.

In the preparation of the titanium catalyst component (i), the amounts of the titanium compound, the magnesium compound the electron donor to be supported, and the other electron donors such as alcohols, phenols, monocarboxylic acid esters, the silicon compound and the aluminum compound which may used as required differ depending upon the method of preparation and cannot be defined in a general manner. For example, about 0.1 to about 10 moles of the electron donor to be supported and about 0.05 mole to about 1000 moles of the titanium compound may be used per mole of the magnesium compound.

Examples of the organoaluminum compound (ii) include (a) organoaluminum compounds at least having an Al-carbon bond in the molecule, for example organoaluminum compounds represented by the general formula $$R^1{}_mAl(OR^2)_nH_pX_q$$

wherein each of R$^1$ and R$^2$, which may be identical or different, represents a hydrocarbon, for example a C$_1$–C$_{15}$ hydrocarbon group, preferably C$_1$–C$_4$ hydrocarbon group, X represents a halogen atom such as $0 \leq m \leq 3$, $0 \leq n \leq 3$, $0 \leq p \leq 3$, $0 \leq q \leq 3$, provided that $m+n+p+q=3$, and, (b) complex alkylated products of aluminum and a metal of Group I of the periodic table represented by the following general formula $$M^1AlR^1{}_4$$

wherein M$^1$ is Li, Na or K, and R$^1$ is as defined above.

Such organoaluminum compounds (ii) are also exemplified in detail in the European patent document cited above.

Illustrative of the organic silicon compound (iii) having an Si—O—C are alkoxysilanes and aryloxysilanes. For example, there may be cited organic silicon compounds represented by the following general formula $$R_nSi(OR^1)_{4-n}$$

wherein R represents a hydrocarbon group, such as an alkyl, cycloalkyl, aryl, alkenyl, haloalkyl, or aminoalkyl group, or halogen, R$^1$ represents a hydrocarbon group such as an alkyl, cycloalkyl, aryl, alkenyl or alkoxyalkyl group, and n is a number represented by $0 \leq n \leq 3$, and n R groups, or (4-n)OR$^1$ groups may be identical or different.

Other examples of the catalyst component (iii) include siloxanes having the group OR$^1$ and silyl esters of carboxylic acid. Compounds in which two or more silicon atoms are bonded to each other through an oxygen or nitrogen atom may be cited as still another example. There may also be used the product of reaction of a compound having no Si—O—C bond with a compound having an O—C bond obtained either in advance or in situ. There can be cited the combined use of a halogen-containing silane compound containing no Si—O—C bond or silicon hydride with an alkoxy group-containing aluminum compound, an alkoxy group-containing magnesium compound, a metal alcoholate, an alcohol, a formic acid ester, ethylene oxide, etc. The organic silicon compounds may also include other metals such as aluminum or tin.

Such an organic silicon compound (iii) having an Si—O—C bond is extensively exemplified in the European patent document.

The copolymerization of 1-butene and propylene can be carried out in any of the liquid phase and the vapor phase. Preferably, it is carried out in the liquid phase under such conditions that the copolymer dissolves. When the copolymerization is to be carried out in the liquid phase, an inert solvent such as hexane, heptane or kerosene may be used as a reaction medium. The olefins themselves may be used as the reaction medium, too. The amount of the catalyst used is such that per liter of the reaction volume, the component (i) is used in an amount of about 0.0001 to about 1.0 millimole as titanium atom, the component (ii) is used in an amount as the metal atom therein of about 1 to about 2000 moles, preferably about 5 to about 500 moles, per mole of the titanium atom in the component (i), and the component (iii) is used in an amount as the Si atom therein of about 0.001 to about 10 moles, preferably about 0.01 to about 2 moles, especially preferably about 0.05 to about 1 mole, per mole of the metal atom in the component (ii).

During the copolymerization, the three catalyst components (i), (ii) and (iii) may be contacted together. Or they may be contacted together before the copolymerization. In contacting them before the copolymerization, any desired two may be selected and contacted, or portions of two or three may be contacted with each other. Furthermore, the contacting of the components before the copolymerization may be carried out in an atmosphere of an inert gas, or in an atmosphere of an olefin.

The copolymerization temperature may be properly chosen, and is preferably abuot 20° to about 200° C., more preferably about 50° to about 180° C. The pressure is from atmospheric pressure to about 100 kg/cm$^2$, preferably about 2 to about 50 kg/cm$^2$. The ratio between 1-butene and propylene fed for producing a copolymer having a propylene content of more than 1 mole % but not exceeding 40 mole % can be properly chosen depending upon the polymerization pressure. For example, the mole ratio of 1-butene to propylene is from about 1 to about 1000.

The molecular weight can be controlled to some extent by changing the polymerization conditions such as the polymerization temperature and the proportions of the catalyst components. The addition of hydrogen to the polymerization system is most effective.

In the laminated structure of this invention, the crystalline propylene random copolymer composition constituting the heat-sealable layer is a mixture of the crystalline random propylene copolymer (I) described above and the random copolymer (II) of 1-butene and propylene described above. In the mixture, the weight ratio of (I)/(II) is from 5/95 to 99/10, preferably from 10/90 to 85/15.

The crystalline radom propylene copolymer composition may include additives in addition to the components (I) and (II). Examples of such additives include other resins miscible with the polymers (I) and (II), heat stabilizers, weather stabilizers, nucleating agents, lubricants, slip agents, antistatic agents, antiblocking agents, antihaze agents, pigments and dyes. These additives may be selected and incorporated in amounts which do not impair the low-temperature heat sealability and heat seal strength of the final laminated structure.

The crystalline propylene random copolymer composition can be formed by uniformly mixing the components (I) and (II) and optionally the above-exemplified additives by a suitable mixing means such as a tumbler, a V-type blender or a Henschel mixer. If desired, after the mixing, the mixture may be kneaded further by such a kneading means as an extruder, a Banbury mixer, a kneader or a roll at a temperature at which the components (I) and (II) are softened or molten.

The following examples illustrate the present invention more specifically. In these examples, the various items shown below were tested by the following methods.

(1) Heat seal strength

That surface of a composite polypropylene film on which the crystalline random propylene copolymer composition is laminated is contacted with itself, and the contacting portion was heat-sealed by means of a seal bar having a width of 5 mm for 1 second under a pressure of 2 kg/cm$^2$ at a given temperature and then allowed to cool spontaneously. A test sample, 15 mm width, is cut off from the heat-sealed product, and the strength at which the heat-sealed portion is peeled apart at a crosshead speed of 200 mm/min. is determined and defined as the heat seal strength. Separately, the above composite polypropylene film is left to stand for 1 week in an air atmosphere at 50° C., and then the strength of the heat-sealed portion is measured by the same method as above and defined as the heat seal strength after heat-treatment.

(2) Scratch resistance

That surface of a composite polypropylene film on which the crystalline random propylene copolymer is laminated is contacted with itself, and the contacting surface portions are rubbed with each other 15 times using an iron block weighing 5 kg as a load. Then, the degree of haze of the sample is measured by the method of (1), and the difference (Δ degree of haze) of the measured degree of haze from the degree of haze of the sample before rubbing is determined.

(3) Antiblocking property (ASTM D1893)

A sample, 10 cm wide and 15 cm long, is cut off from a composite polypropylene film. That surface of the sample on which the crystalline random propylene copolymer composition is laminated is contacted with itself. The contacting portion is held by two glass sheets. A load of 10 kg is placed on it, and the sample is left to stand in an air oven at 50° C. The sample was taken out 1 day and 7 days later, and its peel strength is measured by a universal tester. The peel strength value per cm is defined as a blocking value.

(4) Degree of haze (ASTM D1003)

A film formed is aged in an air oven at 50° C. The degree of haze of the film is measured before the aging and 1 day and 7 days after the aging.

(5) Slipping property

A film prepared in accordance with ASTM D1894 is aged in an air oven at 50° C. The coefficient of static friction and the coefficient of dynamic friction of the film are measured before the aging and 1 day and 7 days after the aging.

The production of the 1-butene random copolymers used in the following Examples and Comparative Examples is shown in Referential Examples 1 to 12, and the properties of the resulting copolymers are summarized in Table 1. Table 2 sumarizes the properties of crystalline polypropylene used as a substrate layer and the crystalline random copolymer (I) incorporated in the crystalline random copolymer composition. These propylene polymers were used in the following Examples and Comparative Examples.

REFERENTIAL EXAMPLE 1

Preparation of a titanium catalyst component (a)

Anhydrous magnesium chloride (4.76 g; 50 mmoles), 25 ml of decane and 23.4 ml (150 mmoles) of 2-ethylhexyl alcohol were reacted at 130° C. for 2 hours to form a uniform solution. Phthalic anhydride (1.11 g; 7.5 mmoles) was added to the solution, and the mixture was stirred for 1 hour at 130° C. to dissolve phthalic anhydride uniformly in the solution. The resulting uniform solution was cooled to room temperature, and 200 ml (1.8 moles) of titanium tetrachloride kept at −20° C. was added dropwise over 1 hour. After the addition, the temperature of the mixture was raised to 110° C. over 4 hours. When its temperature reached 110° C., 2.68 ml (12.5 mmoles) of diisobutyl phthalate was added, and the mixture was maintained at this temperature for 2 hours with stirring. After the 2-hour reaction, the solid portion was collected by hot filtration, and suspended in 200 ml of TiCl$_2$. Again, the suspension was reacted at 110° C. for 2 hours. After the reaction, the solid portion was collected by hot filtration, and washed thoroughly with decane and hexane at 110° C. until no free titanium compound was detected from the washings. The titanium catalyst component (a) so prepared was stored as a hexane slurry. A part of it was dried to examine the composition of the catalyst component. The resulting titanium catalyst component (a) contained 3.1% by weight of titanium, 56.0% by weight of chlorine, 17.0% by weight of magnesium and 20.9% by weight of diisobutyl phthalate.

Polymerization

A 200-liter SUS reaction vessel was continuously charged hourly with 50 kg of 1-butene, 0.5 kg of propylene, 100 mmoles of triethyl aluminum, 10 mmoles of vinyltriethoxysilane and 0.5 mmole, as titanium atom, of the titanium catalyst component (a). The partial hydrogn pressure in the vapor phase was maintained at 1.5 kg/cm$^2$, and the polymerization temperature, at 70° C.

The polymer solution was continuously withdrawn so that the amount of the solution in the reaction vessel became 100 liters. A small amount of methanol was added to stop the polymerization, and the unreacted monomers were removed. A butene-1/propylene copolymer was obtained in an amount of 9.2 kg per hour. The results are shown in Table 1.

REFERENTIAL EXAMPLES 2-8

Referential Example 1 was repeated except that the amount of propylene charged and the partial hydrogen pressure were changed as indicated in Table 1.

REFERENTIAL EXAMPLE 9

A 200-liter reaction vessel was continuously charged hourly with 50 kg of 1-butene, 1.3 kg of propylene, 200 mmoles of diethyl aluminum chloride, and 100 mmoles of titanium trichloride (TAC-131, a product of Toho Titanium Co., Ltd.). The partial hydrogen pressure in the vapor phase was maintained at 2.5 kg/cm$^2$, and the polymerization temperature, at 70° C. The polymerization solution was continuously withdrawn from the reaction vessel so that the amount of the solution residing in the vessel became 100 liters. Methanol was added in an amount of 10 liters per hour. The polymer solution was then washed with water to remove the unreacted monomers. A butene-1/propylene copolymer was obtained in an amount of 7.5 kg per hour. The results are shown in Table 1.

REFERENTIAL EXAMPLE 10

Referential Example 9 was repeated except that the amount of propylene charged and the parital hydrogen pressure were changed as indicated in Table 1. The results are shown in Table 1.

REFERENTIAL EXAMPLE 11

Preparation of a catalyst

Anhydrous magnesium chloride (20 g), 4.6 ml of ethyl benzoate and 30 ml of methylpolysiloxane having a viscosity of 20 cs at 25° C. power introduced under a nitrogen atmosphere into a stainless steel (SUS-32) ball mill cylinder having an inner capacity of 800 ml and an inside diameter of 100 ml and containing 2.8 kg of balls made of stainless steel (SUS-32) and each having a diameter of 15 mm, and contacted with each other at an acceleration of impact of 7.8 G for 100 hours. Ten grams of the resulting solid treated product was suspended in 100 ml of titanium tetrachloride, and the suspension was stirred at 80° C. for 2 hours. After the contacting, the solid component was collected by filtration and washed with purified hexane until no free titanium tetrachloride was detected from the washings. The washed product was dried to obtain a titanium-containing solid catalyst component. The catalyst component contained 2.0% by weight of titanium, 66.0% by weight of chlorine and 6.5% by weight of ethyl benzoate, and had a specific surface area of 200 m$^2$/g.

Polymerization

A 200 liter SUS reaction vessel was continuously charged hourly with 50 kg of 1-butene, 1.6 kg of propylene, 100 mmoles of triethylaminumum, 33 mmoles of methyl p-toluate and 1.0 mmole, calculated as titanium atom, of the titanium catalyst component. The partial hydrogen pressure in the vapor phase was maintained at 2.0 kg/cm$^2$, and the polymerization temperature, at 70° C.

The polymer solution was continuously withdrawn so that the amount of the solution in the reaction vessel became 100 liters. The polymerization was stopped by adding a small amount of methanol, and the unreacted monomers were removed. A copolymer was obtained in an amount of 7.4 kg per hour. The results are shown in Table 1.

REFERENTIAL EXAMPLE 12

The same polymerization as in Referential Example 11 was carried out except that the amount of propylene charged and the partial hydrogen pressure were changed as indicated in Table 1.

TABLE 1

| Referential Example | | Proportions of the monomers | | Propylene content (mole %) | Intrinsic viscosity [η] (dl/g) | DSC melting point [Tm] (°C.) | Crystallinity (%) | (W$_1$) | | (W$_2$) | |
|---|---|---|---|---|---|---|---|---|---|---|---|
| | | 1-Butene (kg/hr) | Propylene (kg/hr) | | | | | (wt %) | 0.03a + 0.5 (wt %) | (wt %) | 4 × [η]$^{-1.2}$ (wt %) |
| 1 | BPC-1 | 50 | 0.5 | 2.3 | 1.9 | 123 | 56.1 | 0.10 | 0.57 | 0.6 | 1.9 |
| 2 | BPC-2 | " | 1.6 | 7.5 | 2.1 | 120 | 55.3 | 0.22 | 0.73 | 0.6 | 1.6 |
| 3 | BPC-3 | " | 2.3 | 10.7 | 2.5 | 117 | 55.0 | 0.26 | 0.82 | 0.7 | 1.3 |
| 4 | BPC-4 | " | 3.5 | 16.3 | 1.9 | 112 | 52.8 | 0.33 | 0.99 | 1.0 | 1.9 |
| 5 | BPC-5 | " | 4.4 | 21.2 | 2.6 | 109 | 49.4 | 0.40 | 1.14 | 1.1 | 1.6 |
| 6 | BPC-6 | " | 6.2 | 30.1 | 2.7 | 80 | 28.5 | 0.46 | 1.40 | 1.1 | 1.5 |
| 7 | BPC-1* | 50 | 0.1 | 0.5 | 2.3 | 127 | 56.0 | 0.07 | 0.52 | 0.4 | 1.5 |
| 8 | BPC-2* | " | 11.3 | 57.1 | 2.1 | 42 | 4.5 | 0.75 | 2.21 | 1.5 | 1.6 |
| 9 | BPC-3* | " | 1.3 | 6.7 | 2.0 | 118 | 48.3 | 2.36 | 0.70 | 3.0 | 1.7 |
| 10 | BPC-4* | " | 3.0 | 15.3 | 2.4 | 110 | 43.6 | 2.63 | 0.96 | 2.6 | 1.4 |
| 11 | BPC-5* | " | 1.6 | 7.5 | 2.1 | 119 | 46.7 | 0.40 | 0.73 | 1.9 | 1.6 |
| 12 | BPC-6* | " | 3.2 | 16.2 | 2.3 | 112 | 42.4 | 0.49 | 0.99 | 1.8 | 1.5 |

| Referential Example | | Yield strength (kg/cm$^2$) | Tensile strength at break (kg/cm$^2$) | Elongation at break (%) | Torsional rigidity (kg/cm$^2$) | Young's modulus (kg/cm$^2$) | Standard deviation (mole %) |
|---|---|---|---|---|---|---|---|
| 1 | BPC-1 | 171 | 510 | 430 | 1500 | 3400 | 0.4 |
| 2 | BPC-2 | 158 | 460 | 460 | 1400 | 3100 | 1.2 |
| 3 | BPC-3 | 146 | 420 | 530 | 1300 | 2800 | 1.7 |
| 4 | BPC-4 | 127 | 350 | 580 | 1100 | 2500 | 2.6 |
| 5 | BPC-5 | 113 | 370 | 610 | 1000 | 2200 | 3.5 |
| 6 | BPC-6 | 85 | 330 | 670 | 700 | 1600 | 5.1 |
| 7 | BPC-1* | 148 | 520 | 350 | 1600 | 3000 | 0.1 |
| 8 | BPC-2* | 62 | 250 | 1100 | 500 | 1200 | 9.3 |
| 9 | BPC-3* | 81 | 340 | 310 | 700 | 1600 | 2.9 |
| 10 | BPC-4* | 63 | 320 | 520 | 500 | 1200 | 6.7 |
| 11 | BPC-5* | 74 | 350 | 470 | 600 | 1400 | 1.5 |
| 12 | BPC-6* | 56 | 310 | 620 | 450 | 1100 | 3.3 |

TABLE 2

| | Comonomer | | Intrinsic viscosity [η] (dl/g) | DSC melting point (°C.) | Crystallinity (%) |
|---|---|---|---|---|---|
| | Type | Content (mole %) | | | |
| PP-1 | — | 0 | 3.3 | 163 | 65 |
| PP-2 | — | 0 | 2.3 | 166 | 67 |
| PP-3 | — | 0 | 3.3 | 164 | 62 |
| PEC-1 | ethylene | 6.3 | 2.3 | 136 | 53 |
| PEB-1 | ethylene | 3.0 | 2.5 | 130 | 50 |
| | 1-butene | 2.8 | | | |

EXAMPLES 1-9 AND COMPARATIVE EXAMPLES 1-10

Pellets of the crystalline random propylene copolymer (I) and pellets of the 1-butrene-type random copolymer (II) shown in Table 3 in the proportions indicated were mixed by a Henschel mixer for 1 minute. The mixture was kneaded in the molten state in a melt-extruder to form a melt of a crystalline random propylene copolymer composition. The composition was fed into a a die for a two-layer film while maintaining the temperature of the resin at 240° C. Separately, the crystalline polypropylene as a substrate layer shown in Table 3 was melted in another extruder, and fed into the aforesaid two-layer film die while maintaining the temperature of the resin at 240° C. The crystalline random propylene copolymer composition and the crystalline polypropylene were co-extruded from the die to form a composite film composed of a substrate layer (40 microns) of the crystalline polypropylene and a layer (10 microns) of the crystalline random propylene copolymer composition. The properties of the composite polypropylene film were evaluated, and the results are shown in Table 3.

EXAMPLES 10-12 AND COMPARATIVE EXAMPLE 11

Each of the crystalline polypropylene substrates shown in Tables 2 and 3 was melted in an extruder, extruded from a T-die at a resin temperature of 270° C., and cooled and solidified into a sheet form. The extrudate was then passed through hot rolls to stretch it in the machine direction at a stretch ratio of 5 and thus form a monoaxially stretched sheet of crystalline polypropylene.

Each of the crystalline random propylene copolymer compositions shown in Table 3 was melt-kneaded in another extruder, and extruded from another T-die at a resin temperature of 250° C. onto one surface of the resulting monoaxially stretched sheet of crystalline polypropylene. The resulting composite sheet was continuously passed through a heated tenter to stretch it in the transverse direction at a stretch ratio of 10. As a result, a composite polypropylene film was obtained which was composed of a biaxially stretched substrate layer (30 microns) of crystalline polypropylene and a monoaxially stretched layer (5 microns) of the crystalline random propylene copolymer composition. The properties of the resulting composite polypropylene film were evaluated, and the results are shown in Table 3.

TABLE 3

| Example (Ex.) or Comparative Example (CEx.) | Crystalline random propylene copolymer composition — Crystalline random propylene copolymer (I) | Random 1-butene copolymer (II) | Weight ratio of (I)/(II) | Substrate polypropylene | Degree of haze (%) Before | After 1 day | After 7 days | Slipping property (coefficient of static friction/coefficient of dynamic friction) Before | After 1 day | After 7 days | Antiblocking property (g/cm) After 1 day | After 7 days | Scratch resistance (%) | Heat seal strength (g/15 mm) 70° C. | 80° C. |
|---|---|---|---|---|---|---|---|---|---|---|---|---|---|---|---|
| Ex. 1 | PEC-1 | BPC-1 | 50/50 | PP-1 | 2.0 | 2.3 | 2.5 | 0.35/0.32 | 0.31/0.27 | 0.34/0.31 | 2.3 | 2.6 | 2.5 | — | 80 |
| Ex. 2 | " | BPC-2 | " | " | 1.8 | 2.3 | 2.5 | 0.36/0.33 | 0.30/0.27 | 0.36/0.32 | 2.4 | 3.0 | 2.8 | — | 120 |
| Ex. 3 | " | BPC-2 | 30/70 | " | 1.6 | 2.0 | 2.5 | 0.41/0.37 | 0.37/0.32 | 0.39/0.39 | 3.8 | 4.6 | 3.3 | 70 | 230 |
| Ex. 4 | " | BPC-3 | 50/50 | " | 1.6 | 2.0 | 2.3 | 0.38/0.34 | 0.33/0.30 | 0.39/0.35 | 2.9 | 3.3 | 3.1 | 80 | 300 |
| Ex. 5 | " | BPC-4 | " | " | 1.6 | 2.1 | 2.7 | 0.40/0.37 | 0.36/0.33 | 0.42/0.39 | 3.8 | 4.8 | 2.9 | 180 | 420 |
| Ex. 6 | " | BPC-5 | " | " | 1.5 | 2.0 | 2.6 | 0.41/0.37 | 0.37/0.34 | 0.43/0.39 | 3.6 | 4.2 | 3.5 | 320 | 730 |
| Ex. 7 | " | BPC-6 | " | " | 1.4 | 2.1 | 2.7 | 0.43/0.40 | 0.39/0.35 | 0.45/0.41 | 4.1 | 4.9 | 3.7 | 280 | 1120 |
| Ex. 8 | PEB-1 | BPC-2 | " | " | 1.5 | 2.1 | 2.3 | 0.35/0.33 | 0.30/0.27 | 0.35/0.32 | 2.5 | 3.0 | 2.7 | — | 110 |
| Ex. 9 | " | " | 30/70 | " | 1.4 | 2.3 | 2.8 | 0.40/0.37 | 0.38/0.35 | 0.43/0.38 | 3.7 | 4.5 | 3.4 | 80 | 180 |
| Ex. 10 | PEC-1 | " | 50/50 | PP-3 | 1.4 | 1.8 | 2.1 | 0.37/0.33 | 0.32/0.29 | 0.36/0.31 | 2.2 | 2.8 | 2.6 | — | 120 |
| Ex. 11 | " | " | 30/70 | " | 1.3 | 1.6 | 1.9 | 0.40/0.37 | 0.35/0.31 | 0.42/0.38 | 3.5 | 4.3 | 3.5 | 80 | 210 |
| Ex. 12 | PEB-1 | " | 50/50 | " | 1.4 | 1.7 | 2.0 | 0.34/0.31 | 0.30/0.28 | 0.34/0.32 | 2.3 | 2.7 | 2.7 | — | 130 |
| CEx. 1 | PEC-1 | — | 100/0 | PP-1 | 1.2 | 1.5 | 1.7 | 0.33/0.30 | 0.27/0.25 | 0.29/0.26 | 0.6 | 0.8 | 2.0 | — | — |
| CEx. 2 | — | BPC-2 | 0/100 | " | 1.5 | 2.8 | 4.4 | 0.56/0.48 | 0.75/0.83 | —/—* | 6.7 | 10.5 | 7.5 | 600 | 780 |
| CEx. 3 | PEC-1 | BPC-1* | 50/50 | " | 4.3 | 4.5 | 4.9 | 0.41/0.36 | 0.30/0.34 | 0.35/0.30 | 0.7 | 0.8 | 2.2 | — | — |
| CEx. 4 | " | BPC-2* | " | " | 2.2 | 3.5 | 5.0 | 0.45/0.39 | 0.70/0.79 | —/—* | 6.1 | 10.5 | 5.8 | 230 | 490 |
| CEx. 5 | " | BPC-3* | " | " | 2.1 | 4.5 | 6.6 | 0.43/0.38 | 0.70/0.81 | —/—* | 6.5 | 12.3 | 3.0 | — | 170 |
| CEx. 6 | " | BPC-4* | " | " | 2.1 | 5.8 | 7.9 | 0.45/0.40 | 0.81/0.95 | 0.81/0.70 | 7.6 | 16.2 | 3.8 | 190 | 350 |
| CEx. 7 | " | BPC-5* | " | " | 2.0 | 3.1 | 4.6 | 0.38/0.35 | 0.30/0.37 | 0.95/0.71 | 4.7 | 8.8 | 2.8 | — | 100 |
| CEx. 8 | " | BPC-6* | " | " | 2.0 | 3.8 | 5.1 | 0.35/0.36 | 0.35/0.35 | 0.81/0.70 | 5.2 | 10.1 | 3.3 | 170 | 400 |
| CEx. 9 | PP-2 | BPC-2 | 30/70 | " | 1.9 | 2.5 | 2.8 | 0.31/0.29 | 0.26/0.24 | 0.29/0.26 | 2.1 | 2.7 | 2.4 | — | 70 |
| CEx. 10 | " | " | 50/50 | PP-3 | 1.7 | 2.2 | 2.6 | 0.36/0.32 | 0.30/0.27 | 0.36/0.33 | 3.4 | 4.1 | 2.7 | 80 | 210 |
| CEx. 11 | PEC-1 | BPC-5* | " | " | 1.5 | 2.3 | 3.0 | 0.36/0.34 | 0.32/0.34 | 0.65/0.53 | 4.2 | 7.9 | 2.9 | — | 90 |

| Example (Ex.) or Comparative Example (CEx.) | Properties of the laminated structure — Heat seal strength (g/15 mm) 90° C. | 100° C. | 110° C. | 120° C. | 130° C. | Heat seal strength after heat-treatment (g/15 mm) 90° C. | 100° C. | 110° C. | 120° C. | 130° C. | 140° C. |
|---|---|---|---|---|---|---|---|---|---|---|---|
| Ex. 1 | 130 | 380 | 920 | 1680 | 1700 | 100 | 350 | 800 | 1380 | 1680 | 1700 |
| Ex. 2 | 350 | 620 | 1300 | 1680 | 1690 | 100 | 280 | 600 | 1260 | 1650 | 1680 |
| Ex. 3 | 520 | 1180 | 1550 | 1580 | 1590 | 180 | 450 | 920 | 1550 | 1580 | 1600 |
| Ex. 4 | 530 | 1070 | 1530 | 1620 | 1650 | 180 | 390 | 950 | 1570 | 1600 | 1680 |
| Ex. 5 | 890 | 1320 | 1550 | 1600 | 1680 | 300 | 720 | 1180 | 1580 | 1620 | 1680 |
| Ex. 6 | 1100 | 1530 | 1580 | 1620 | 1680 | 460 | 870 | 1550 | 1600 | 1600 | 1650 |
| Ex. 7 | 1450 | 1480 | 1550 | 1560 | 1580 | 990 | 1320 | 1480 | 1550 | 1600 | 1580 |
| Ex. 8 | 330 | 700 | 1280 | 1690 | 1710 | 110 | 220 | 590 | 1170 | 1650 | 1680 |
| Ex. 9 | 490 | 1090 | 1590 | 1580 | 1580 | 180 | 390 | 1010 | 1570 | 1570 | 1600 |
| Ex. 10 | 390 | 550 | 540 | 540 | 560 | 150 | 400 | 530 | 550 | 560 | 560 |
| Ex. 11 | 470 | 560 | 550 | 550 | 560 | 300 | 520 | 550 | 540 | 550 | 560 |
| Ex. 12 | 380 | 550 | 560 | 560 | 560 | 150 | 420 | 550 | 550 | 560 | 560 |
| CEx. 1 | — | — | 90 | 90 | 350 | — | — | — | — | 150 | 670 |
| CEx. 2 | 1350 | 1380 | 1360 | 1370 | 1350 | 610 | 800 | 1100 | 1320 | 1350 | 1380 |
| CEx. 3 | — | 80 | 310 | 900 | 1650 | — | — | 120 | 510 | 1120 | 1680 |
| CEx. 4 | 700 | 980 | 1250 | 1430 | 1480 | 290 | 430 | 720 | 950 | 1190 | 1450 |
| CEx. 5 | 400 | 780 | 1300 | 1670 | 1690 | 60 | 120 | 290 | 650 | 970 | 1680 |

TABLE 3-continued

| | | | | | | | | | | | | | |
|---|---|---|---|---|---|---|---|---|---|---|---|---|---|
| CEx. 6 | 690 | 1320 | 1680 | 1690 | 1700 | — | 100 | 250 | 570 | 880 | 1190 | 1680 |
| CEx. 7 | 360 | 600 | 1280 | 1650 | 1650 | — | 80 | 210 | 520 | 970 | 1350 | 1650 |
| CEx. 8 | 900 | 1300 | 1560 | 1620 | 1650 | 60 | 190 | 310 | 500 | 920 | 1150 | 1650 |
| CEx. 9 | 250 | 530 | 800 | 1030 | 1250 | — | 80 | 300 | 600 | 830 | 1090 | 1260 |
| CEx. 10 | 500 | 610 | 830 | 1100 | 1250 | 70 | 180 | 330 | 650 | 900 | 1120 | 1280 |
| CEx. 11 | 310 | 530 | 550 | 560 | 560 | — | 60 | 110 | 230 | 380 | 540 | 560 |

Note: "—*" means that the measurement was impossible.

What is claimed is:

1. A laminated structure comprising a substrate layer of a crystalline propylene resin and, positioned in direct contact with at least one surface of said substrate layer, a heat-sealable layer of a crystalline random propylene copolymer composition, wherein the crystalline random propylene copolymer composition is a mixture composed of
(I) a crystalline random propylene copolymer of a major amount of propylene with a minor amount of another alpha-olefin, and
(II) a random copolymer consisting essentially of more than 60 to 99 mole % of 1-butene and less than 40 to 1 mole % of propylene,
the weight ratio of (I)/(II) being from 5/95 to 90/10, and the random copolymer (II) has
(A) an intrinsic viscosity $[\eta]$, determined in decalin at 135° C., of 0.5 to 6 dl/g,
(B) a DSC melting point (Tm), measured by a differential scanning calorimeter, of 50° to 130° C.,
(C) a degree of crystallinity, measured by X-ray diffractometry, of 5 to 60%,
(D) a boiling methyl acetate-soluble content ($W_1$) of not more than 2% by weight based on the weight of the copolymer (II), and
(E) an n-decane/acetone (1:1 by volume) mixture-soluble content ($W_2$) of less than $4 \times [\eta]^{-1.2}$ in % by weight based on the weight of the copolymer (II).

2. The laminated structure of claim 1 wherein the crystalline propylene resin constituting the substrate layer is crystalline polypropylene or a crystalline copolymer of propylene with up to 10 mole % of another alpha-olefin.

3. The laminated structure of claim 2 wherein the crystalline propylene resin has an intrinsic viscosity, determined in decalin at 135° C., of 1.5 to 4 dl/g.

4. The laminated structure of claim 1 wherein the crystalline random copolymer (I) is composed of 99 to 85 mole % of propylene and 1 to 15 mole % of the other alpha-olefin.

5. The laminated structure of claim 4 wherein the crystalline random propylene copolymer (I) has an intrinsic viscosity, determined in decalin at 135° C., of 1.5 to 4 dl/g.

6. The laminated structure of claim 4 wherein the crystalline random propylene copolymer (I) has a DSC melting point, measured by a differential scanning calorimeter, of 120° to 155° C.

7. A crystalline random propylene copolymer composition comprising a mixture composed of
(I) a crystalline random propylene copolymer of a major amount of propylene with a minor amount of another alpha-olefin, and
(II) a random copolymer consisting essentially of more than 60 to 99 mole % of 1-butene and less than 40 to 1 mole % of propylene,
the weight ratio of (I)/(II) being from 5/95 to 90/10, and the random copolymer (II) having
(A) an intrinsic viscosity $[\eta]$, determined in decalin at 135° C., of 0.5 to 6 dl/g,
(B) a DSC melting point (Tm), measured by a differential scanning calorimeter, of 50° to 130° C.,
(C) a degree of crystallinity, measured by X-ray diffractometry, of 5 to 60%,
(D) a boiling methyl acetate-soluble content ($W_1$) of not more than 2% by weight based on the weight of the copolymer (II), and
(E) an n-decane/acetone (1:1 by volume) mixture-soluble content ($W_2$) of less than $4 \times [\eta]^{-1.2}$ in % by weight based on the weight of the copolymer (II).

8. The composition of claim 7 wherein the crystalline random propylene copolymer (I) is composed of 88 to 85 mole % of propylene and 1 to 15 mole % of the other alpha-olefin.

9. The composition of claim 8 wherein the crystalline random propylene copolymer (I) has an intrinsic viscosity, determined in decalin at 135° C., of 1.5 to 4 dl/g.

10. The composition of claim 8 wherein the crystalline random propylene copolymer has a DSC melting point, measured by a differential scanning calorimeter, of 120° to 155° C.

11. The laminated structure of claim 1 wherein the random copolymer (II) has a ($W_1$) (E) of from $0.1 \times [\eta]^{-1.2}$ to $4 \times [\eta]^{-1.2}$% by weight.

12. The laminated structure of claim 1 wherein the random copolymer (II) has a ($W_2$) (E) of from $0.2 \times [\eta]^{-1.2}$ to $3.5 \times [\eta]^{-1.2}$% by weight.

13. The laminated structure of claim 7 wherein the random copolymer (II) has a ($W_1$) (E) of from $0.1 \times [\eta]^{-1.2}$ to $4 \times [\eta]^{-1.2}$% by weight.

14. The laminated structure of claim 7 wherein the random copolymer (II) has a ($W_2$) (E) of from $0.2 \times [\eta]^{-1.2}$ to $3.5 \times [\eta]^{-1.2}$% by weight.

* * * * *